United States Patent [19]

Bergkvist

[11] Patent Number: 5,029,050
[45] Date of Patent: Jul. 2, 1991

[54] DIPPABLE HEADLAMPS

[75] Inventor: Lars A. Bergkvist, Själevad, Sweden

[73] Assignee: Labino Patent AB, Själevad, Sweden

[21] Appl. No.: 573,146

[22] PCT Filed: Jan. 10, 1990

[86] PCT No.: PCT/SE90/00017

§ 371 Date: Sep. 18, 1990

§ 102(e) Date: Sep. 18, 1990

[87] PCT Pub. No.: WO90/08673

PCT Pub. Date: Aug. 9, 1990

[30] Foreign Application Priority Data

Jan. 24, 1989 [SE] Sweden ............... 8900250

[51] Int. Cl.$^5$ ............................... B60Q 1/04
[52] U.S. Cl. ........................ 362/61; 362/280; 362/293
[58] Field of Search ............ 362/61, 80, 280, 293, 362/307, 310, 319

[56] References Cited

U.S. PATENT DOCUMENTS

| | | | |
|---|---|---|---|
| 2,343,518 | 3/1944 | Baker | 240/15 |
| 4,766,526 | 8/1988 | Morimoto et al. | 362/293 X |
| 4,951,178 | 8/1990 | Shirai et al. | 362/319 X |
| 4,970,628 | 11/1990 | Bergkvist | 362/61 |

FOREIGN PATENT DOCUMENTS 449776 9/1927 Fed. Rep. of Germany.
483263 10/1929 Fed. Rep. of Germany.
2249930 4/1974 Fed. Rep. of Germany.

OTHER PUBLICATIONS

Svenska Dagbladet, vol. 105, Jan. 1989 (Stockholm), Dag Bjerke: "Bilstralkastare provas med ljus som varken syns eller bländar", see p. 6.
Dag Bjerke: "Bilstralkastare provas med ljus som varken syns eller bländar".

Primary Examiner—Stephen F. Husar
Attorney, Agent, or Firm—Nies, Kurz, Bergert & Tamburro

[57] ABSTRACT

A dippable vehicle-headlamp, particularly a car headlamp, which is operative to transmit both ultra-violet and visible light and which includes a light source which is intended to emit both visible and ultra-violet light, a reflector and a filter. The reflector (1) and the light source (2) are intended to transmit simultaneously a light lobe which corresponds to a dipped-beam lobe and a full-beam lobe. The filter (4) is intended to filter-out visible light, but to transmit ultra-violet light. The invention is characterized in that the filter is mounted for displacement from a first position (FIG. 1) in which the filter (4) is located out of the beam path for transmission of the light lobe, to a second position (FIG. 2) in which the filter (4) is located in the beam path for at least that part of the light lobe which constitutes the difference between the full-beam lobe and the dipped-beam lobe, such that when the filter (4) is located in the aforementioned second position solely ultra-violet light will be transmitted in that part of the transmitted light lobe which constitutes the aforementioned difference, whereas both visible light and ultra-violet light will be transmitted in that part of the light lobe which corresponds to a dipped-beam lobe.

6 Claims, 1 Drawing Sheet

DIPPABLE HEADLAMPS

The present invention relates to a dippable vehicle headlamp, particularly a car headlamp, which is constructed to emit ultraviolet light and visible light.

The interest in the use of ultraviolet light for illuminating the forward surroundings of a vehicle has increased in recent years. Ultraviolet light fluoresces a number of materials conventionally used. It is found in this regard that such materials are present in sufficient numbers to enable objects to be discerned from considerable distances when ultraviolet light is used.

The effect is particularly noticeable when a comparison is made between the case where normal white light is used for a dipped or low beam and ultraviolet light is used for a full or far beam. In this case, solely ultraviolet light is present in the light lobe which forms the difference between the full beam and the dipped beam. Naturally, this ultraviolet light will not dazzle the driver of an oncoming vehicle. As before mentioned, despite the fact that this light is not visible the number of fluorescing objects in front of the vehicle is sufficient to enable the driver of a vehicle fitted with headlamps which emit ultraviolet light to discern objects in the path of the vehicle much more easily than is otherwise the case.

The Swedish Patent Specification No. . . . , (Swedish Patent Application No. 8704118-2) (see U.S. Pat. No. 4,970,628) teaches a vehicle headlamp where the light source is operative to emit both visible and ultraviolet light and where the headlamp is constructed to emit light in accordance with both a full beam lobe and a dipped beam lobe. A vehicle which is fitted with headlamps of this construction must therefore also be fitted with headlamps which are able to emit visible light in the full beam mode of the headlamps. This double array of headlamps may be highly preferable in the case of many vehicles, inter alia because various types of light sources can then be used in the different headlamps.

There have recently been developed light sources which emit both visible and ultraviolet light at suitable densities and which can be used advantageously in a headlamp such as to provide adequate vehicle lighting where the aforersaid double array of headlamps is not necessary.

The problem in this case, however, is that it is not possible to switch quickly between full and dipped beams, since the light sources used to emit ultraviolet light are of the discharge kind. Such light sources incorporate a certain unacceptable ignition time. When only one reflector is provided, it is necessary to use two light sources which are located in mutually different positions relative to the reflector, in order to be able to switch between full and dipped beams.

The present invention solves the problem of being able to switch rapidly between full and dipped beams when using light sources which emit visible and ultraviolet light.

The present invention thus relates to a dippable vehicle headlamp, particularly a car headlamp, which is operative to emit both ultraviolet light and visible light and which includes a light source constructed to emit both visible and ultraviolet light, a reflector and a filter, where the reflector and the light source are intended to emit a light lobe which corresponds approximately to a dipped beam lobe and a full beam lobe and where the filter is operative to filter away visible light but transmit ultraviolet light. The invention is characterised in that the filter can be moved from a first position in which it is remote from the transmission path of said light lobe to a second position in which it is located in the beam path of at least that part of the light lobe which is constituted by the difference between the full beam lobe and the dipped beam lobe, wherewith when the filter is in said second position only ultraviolet light is transmitted in that part of the beam lobe that constitutes said difference, whereas both visible light and ultraviolet light is transmitted in that part of the light lobe which corresponds to the dipped beam lobe.

The invention will now be described in more detail with reference to exemplifying embodiments thereof illustrated in the accompanying drawings, in which FIGS. 1 and 2 illustrate schematically various functional states of an inventive headlamp;

Figure 1:
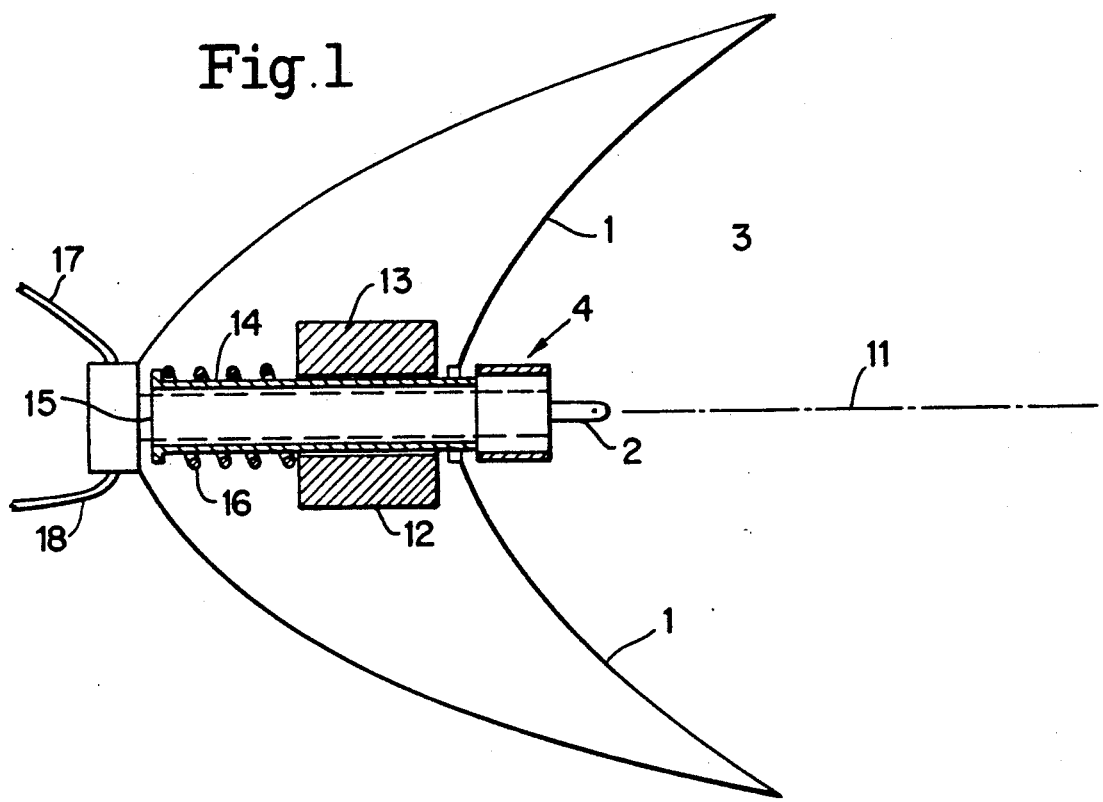
Figure 2:
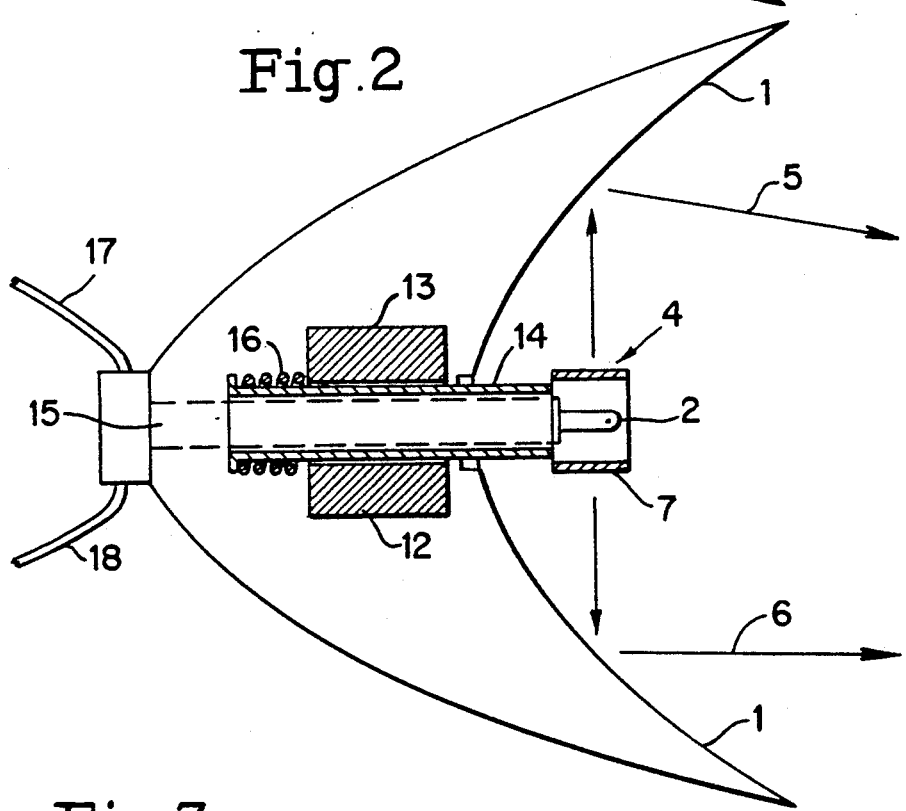

FIGS. 1 and 2 illustrate an inventive headlamp which includes a reflector 1 and a light source 2. The light source is operative to emit both visible light and ultraviolet light. The light source is a suitable discharge type source of known kind.

According to the invention the reflector 1 and the light source 2 are intended to transmit simultaneously a light lobe which corresponds to a dipped beam lobe and a full beam lobe. Also included is a filter 4 which is intended to filter out visible light, but which is transparent to ultraviolet light. The filter 4 is displaceably mounted, so as to be movable from a first position, illustrated in FIG. 1, in which the filter is located outside the beam path for transmission of said light lobe, to a second position, shown in FIG. 2, in which the filter is located in the beam path of at least that part of said light lobe which constitutes the difference between the full beam lobe and the dipped beam lobe. Thus, when the filter is located in said second position solely ultraviolet light is transmitted in that part of the transmitted light lobe which constitutes the difference between a full beam lobe and a dipped beam lobe. On the other hand, both visible light and ultraviolet light will be transmitted in that part of the light lobe which corresponds to a dipped beam lobe. This is illustrated in FIG. 2 by the arrow 5, which relates to light which has passed from the light source through the filter 4 and has been reflected downwards by the reflector 1. The arrow 6 illustrates light which has been emitted by the light source but has not passed through a light filter and which has been reflected slightly upwards and horizontally by the reflector.

Figure 3:
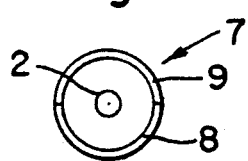
FIG. 3 illustrates part of the headlamp, seen from the right in FIG. 1.

According to one preferred embodiment, the filter 4 comprises a fully cylindrical, or partly cylindrical device 7 which can be displaced in a manner to fully or partially surround the light source when occupying said second position, as illustrated in FIG. 2. FIG. 3 shows the cylindrical device from the right in FIG. 2. In order to ensure that only a part of the light emitted from the light source will be filtered in the aforesaid manner, the cylindrical device 7 includes two parts, of which one part 8 constitutes a filter and the remaining part 9 comprises a material which is transparent to both visible and ultraviolet light.

The two cylinder parts 8, 9 are given mutually different sizes which depend on the configuration of the reflector and the position of the light source in relation to said reflector, and which also depend on in which part of the total light lobe filtered light is desired. In particular cases, the whole of the cylindrical part 4 may comprise a filter operative to filter out visible light, in which case the headlamp will emit solely ultraviolet light when the filter is located in its second position.

The cylinder part 8 intended to filter out ultraviolet light preferably comprises Woods glass. The other cylindrical part 9 preferably comprises a glass or plastics material which is transparent to both ultraviolet light and visible light.

Figure 4:
FIG. 4 illustrates a modified version of the headlamp part shown in FIG. 3.

FIG. 4 illustrates an alternative embodiment to the embodiment illustrated in FIG. 3, the filter of the FIG. 4 embodiment solely including a semicylindrical part 10 which is made of a material which filters away ultraviolet light.

According to one preferred embodiment, the longitudinal axis of the cylindrical part coincides substantially with the optical axis 11 of the headlamp. The filter is attached to a device 12 at the end of the filter remote from the headlamp opening 3, the device 12 being operative to displace the filter along its longitudinal axis between said two positions.

According to one preferred embodiment, the filter displacing device has the form of a draw magnet device 13 of some suitable kind which comprises a coil and a draw rod 14, with the filter connected to the draw rod. The draw rod 14 preferably has the form of a tube through which a light source attachment 15 extends. The attachment 15 is illustrated purely schematically by broken lines in FIGS. 1 and 2, since the attachment itself can have any suitable configuration without detriment to the present invention.

When the filter displacement device has the form of a draw magnet, a spring 16 will preferably be mounted between the draw rod 14 and the magnet 13, this spring 16 being operative to displace the filter to its aforesaid first position, whereas the draw magnet displaces the filter to its aforesaid second position.

The reference numeral 17 identifies electrical conductors through which current is delivered to the draw magnet. The reference numeral 18 indicates conductors through which current is delivered to the light source.

The present invention operates in the following manner. When the driver desires a full-beam picture for visible light, he manipulates a switch which activates current supply to the draw magnet, therewith causing the filter to be moved to its aforesaid first position. This maneuver results in a full beam picture for both visible light and ultraviolet light.

When the driver meets an oncoming vehicle, or when the driver wishes to dip his headlamps for some other reasons, the switch is manipulated in a manner to cause current to be supplied to the draw magnet, such that the filter is displaced from its first position to its second position. When the filter occupies its second position, the visible light is changed from a full beam lobe picture to a dipped beam lobe picture, whereas the ultraviolet light continues to illuminate in accordance with a full beam lobe. It would be preferable, in many instances, for the filter to occupy its aforesaid second position in the absence of current supply to the magnet, so that visible light will illuminate in accordance with a dipped beam lobe in the event of a malfunction in the current supply which prevents current from being delivered to the draw magnet.

The present invention thus solves the problem discussed in the introduction. The invention enables changes to be made rapidly between different visible light beam patterns, while retaining ultraviolet light in accordance with a full beam lobe.

The invention has been described in the aforegoing with reference to different embodiments thereof. It will be understood, however, that these embodiments can be modified in many ways by the person skilled in this art. For instance, the filter displacing device can have a form different to that described here. Furthermore, the filter may be given a different form capable of being adapted to the configuration of the light source used. Furthermore, a material other than Woods glass can be used to filter out visible light and permit ultraviolet light to pass through.

The invention is therefore not restricted to the aforedescribed embodiments, since modifications can be made within the scope of the following claims.

I claim:

1. A dippable vehicle headlamp, particularly a car headlamp, which is operative to emit both ultraviolet and visible light and which includes a light source which is intended to emit both visible and ultraviolet light, a reflector and a filter, where the reflector (1) and the light source (2) are intended to transmit simultaneously a light lobe which corresponds to a dipped-beam lobe and a full beam lobe, and where the filter (4) is intended to filter out visible light but to transmit ultraviolet light, characterized in that the filter is mounted for movement from a first position (FIG. 1) in which the filter (4) is located outside the beam path for transmission of said light lobe, to a second position (FIG. 2) in which the filter (4) is located in the beam path for at least that part of said light lobe which constitutes the difference between the full beam lobe and the dipped beam lobe, wherewith when the filter (4) is located in said second position only ultraviolet light will be transmitted in that part of the transmitted light lobe which constitutes said difference, whereas both visible light and ultraviolet light is transmitted in that part of said light lobe which corresponds to a dipped beam lobe.

2. A dippable headlamp according to claim 1, characterized in that the filter (4) comprises a fully cylindrical or partly cylindrical device (7) which can be displaced so as to fully or partially surround the light source (2) in said second position.

3. A dippable headlamp according to claim 1, characterized in that the longitudinal axis of said cylindrical device (7) coincides with the optical axis (11) of the headlamp; and in that the filter (4) is connected at its end remote from the headlamp opening (3) to a means (12) operative to displace the filter (4) along its longitudinal axis, between said two positions.

4. A dippable headlamp according to claim 1, characterized in that a part (8) of said cylindrical device (7) comprises a filter (4), and in that the remaining part (9) of said cylindrical device (7) comprises a material which is transparent to both visible and ultraviolet light.

5. A dippable headlamp according to claim 1, characterized in that the filter displacing means (12) includes a draw magnet (13) which comprises a coil and a draw rod (14); and in that the cylindrical device (7) is connected to the draw rod (14).

6. A dippable headlamp according to claim 1, characterized in that the drawrod (14) comprises a tube through which a light source attachment (15) extends.

* * * * *